United States Patent
Mabuchi et al.

(10) Patent No.: US 8,615,165 B2
(45) Date of Patent: Dec. 24, 2013

(54) VIDEO-RECORDING AND REPLAYING APPARATUS, I/O SCHEDULING METHOD, AND PROGRAM

(75) Inventors: Takuma Mabuchi, Kanagawa (JP); Satoshi Obata, Kanagawa (JP)

(73) Assignee: Sony Corporation (JP)

( * ) Notice: Subject to any disclaimer, the term of this patent is extended or adjusted under 35 U.S.C. 154(b) by 58 days.

(21) Appl. No.: 13/241,717

(22) Filed: Sep. 23, 2011

(65) Prior Publication Data

US 2012/0087632 A1    Apr. 12, 2012

(30) Foreign Application Priority Data

Oct. 6, 2010   (JP) ................................ P2010-226674

(51) Int. Cl.
*H04N 5/783* (2006.01)
(52) U.S. Cl.
USPC ......................................................... 386/351
(58) Field of Classification Search
None
See application file for complete search history.

(56) References Cited

U.S. PATENT DOCUMENTS

2007/0124733 A1   5/2007  Bril et al.
2010/0209075 A1*  8/2010  Lee et al. ...................... 386/68

FOREIGN PATENT DOCUMENTS

JP    2007-519103 A    7/2007
JP    2010-113524 A    5/2010

* cited by examiner

*Primary Examiner* — William C Vaughn, Jr.
*Assistant Examiner* — Daniel Tekle
(74) *Attorney, Agent, or Firm* — Lerner, David, Littenberg, Krumholz & Mentlik, LLP (57) ABSTRACT

A video-recording and replaying apparatus includes a block device for use as a recording medium for video-recording and a control part, when a plurality of tasks each representing a process in regard to video-recording and replaying on the block device are executed, performing I/O scheduling on the block device by using time slices each predetermined for each of the tasks so that a total amount of I/O data for each of the tasks in each round-robin cycle for the block device is approximately equal.

5 Claims, 6 Drawing Sheets

VIDEO-RECORDING AND REPLAYING APPARATUS, I/O SCHEDULING METHOD, AND PROGRAM

CROSS-REFERENCE TO RELATED APPLICATION

The present application claims priority from Japanese Patent Application No. JP 2010-226674 filed in the Japanese Patent Office on Oct. 6, 2010, the entire content of which is incorporated herein by reference.

BACKGROUND

The present disclosure relates to a video-recording and replaying apparatus, I/O scheduling method, and program capable of performing I/O scheduling on a block device in a multitask environment.

In recent years, general video-recording and replaying apparatuses can perform simultaneous video-recording of a plurality of channels and video-recording of a program while replaying a video-recorded program. As a storage for these video-recording and replaying apparatuses, a block device is used, such as a Blu-ray drive or a hard disk drive. The block device is a storage in which data write and read are performed by a predetermined unit (a block unit). Inputs and outputs of data to and from the block device are performed through a file system.

For simultaneous video-recording of a plurality of channels and simultaneous video-recording and replaying for the block device, it is important to impartially allocate I/O (input/output) resources for the block device to each process. I/O scheduling is a technology of impartially allocating I/O resources for the block device to a plurality of tasks.

For example, a CFQ (completely fair queuing) scheduler is an I/O scheduler currently incorporated in a Linux kernel as a standard (refer to Japanese Unexamined Patent Application Publication No. 2010-113524 (paragraphs [005]-[0058])). In the CFQ scheduler, an I/O request is registered in a request queue corresponding to a degree of priority. In each request queue, a time slice determined according to the degree of priority of the I/O request is set. Normally, an I/O request from a task with a relatively high degree of demand for real-time properties is provided with a high degree of priority, and an I/O request from a task with a relatively low degree of demand for real-time properties is provided with a low degree of priority.

The CFQ scheduler merges I/O requests to adjacent sectors into a single data structure called an I/O request for each same type (read request or write request), and registers the I/O request in a request queue. The CFQ scheduler selects one request queue not being blank from among a plurality of request queues with a round-robin scheme, for example, selecting the I/O requests one by one from the selected request queue within the time slice and passing the I/O requests to a device driver. After a lapse of the time slice, the CFQ scheduler selects a request queue with the same or next higher degree of priority, and selects an I/O request from that request queue and passes the I/O request to the device driver. With this, the I/O requests are executed by the device driver.

SUMMARY

As described above, in the CFQ scheduler, an I/O request from a task with a relatively high degree of demand for real-time properties is provided with a high degree of priority, and an I/O request from a task with a relatively low degree of demand for real-time properties is provided with a low degree of priority. More specifically, the frequency of access to the block device (the frequency of occurrence of an I/O request) or the like is used as an index for determining the degree of priority.

However, at fast-forward replay, data is typically read from the block device at a high rate compared with that at normal replay. For this reason, the number of I/O requests per unit time is large. Therefore, when the degree of priority is determined in consideration of the frequency of access to the block device according to a typical I/O scheduling technique, an I/O request for fast-forward replay is allocated with a high degree of priority, and is also allocated with a long time slice accordingly. However, when a long time slice is allocated to a specific task, a large number of I/O resources for the block device are used to process that task. For this reason, when another real-time task, such as video-recording or normal replay, is to be performed simultaneously with fast-forward replay, it may be difficult to allocate I/O resources sufficient for performing this other real-time task. In particular, at video-recording or replaying of a program, read or write is continuously performed onto the block device for a relatively long time. Therefore, continuous shortages of I/O resources may cause an actual damage, such as buffer underrun.

It is desirable to provide a video-recording and replaying apparatus, I/O scheduling method, and program capable of reducing nonuniformity of the amount of I/O data for a block device among tasks and excellently performing multitasking in regard to video-recording and replaying.

A video-recording and replaying apparatus according to an embodiment of the present disclosure includes a block device for use as a recording medium for video-recording and a control part, when a plurality of tasks each representing a process in regard to video-recording and replaying on the block device are executed, performing I/O scheduling on the block device by using time slices each predetermined for each of the tasks so that a total amount of I/O data for each of the tasks in each round-robin cycle for the block device is approximately equal.

In an embodiment of the present disclosure, a time slice for each task is uniquely set in advance. The time slice fixed for each task is set not by following a typical I/O scheduling technique of increasing the time slice for a real-time task with a higher degree of frequency of access to the block device, but is set to have a value so that a total amount of I/O data for each task in each round-robin cycle for the block device is approximately equal. With this, when I/O resources for the block device are shared among tasks, nonuniformity of the amount of I/O data among tasks can be reduced. This is particularly useful when fast-forward replay and video-recording of a broadcast program are simultaneously performed in a video-recording and replaying apparatus, and the reason for this is as follows. At fast-forward replay, I/O processing is performed on the block device at a high rate compared with that at video-recording. According to typical I/O scheduling, a large number of I/O resources are used by this fast-forward replay task, and I/O resources to be allocated to a task for video-recording a broadcast program tend to run short. If I/O resources to be allocated for transmission to the block device from a buffer area where program data received in video-recording of a broadcast program is temporarily stored are decreased, a video-recording error occurs due to buffer overflow. According to the embodiment of the present disclosure, the occurrence of such a video-recording error can be prevented.

When a request queue of a task being selected is blank, the control part performs task switching without waiting for a lapse of the time slice. With this, use efficiency of I/O resources can be improved. Also from this point of view, multitasking in regard to video-recording and replaying can be excellently performed.

The control part repeatedly performs a process of setting a time obtained by subtracting an excess from the time slice at the end of execution of an I/O request from a default time slice as a time slice in a next round-robin cycle and resetting the time slice to the default time slice in a cycle subsequent to the next cycle. This can prevent accumulation of delay times in timings of starting a process of a task subsequent to a task for I/O processing on the block device at a high rate, such as fast-forward replay, and can more mitigate nonuniformity of the amount of I/O data among tasks.

In an I/O scheduling method of a video-recording and replaying apparatus according to another embodiment of the present disclosure, when a plurality of tasks each representing a process in regard to video-recording and replaying on a block device for use as a recording medium for video-recording are executed, I/O scheduling is performed on the block device by using time slices each predetermined for each of the tasks so that a total amount of I/O data for each of the tasks in each round-robin cycle for the block device is approximately equal.

A program according to still another embodiment of the present disclosure causes a computer to operate as a control part performing I/O scheduling on a block device for use as a recording medium for video-recording by using time slices each predetermined for each of a plurality of tasks each representing a process in regard to video-recording and replaying on the block device so that a total amount of I/O data for each of the tasks in each round-robin cycle for the block device is approximately equal.

According to the embodiments of the present disclosure, nonuniformity of the amount of I/O data for a block device among tasks can be reduced, and multitasking in regard to video-recording and replaying can be excellently performed.

DETAILED DESCRIPTION OF EMBODIMENTS

With reference to the drawings, embodiments of the present disclosure are described below.

An embodiment relates to a video-recording and replaying apparatus capable of video-recording program data, such as video and audio, obtained from outside in a block device, such as a Blu-ray disk or a hard disk drive, and replaying the video-recorded program data. Also, another embodiment relates to a video-recording and replaying apparatus capable of performing a plurality of processes with I/O (input and output) to or from a block device virtually at the same time, the processes including simultaneous video-recording of a plurality of channels and simultaneous video-recording and replaying.

Embodiment

Hardware Structure of the Video-Recording and Replaying Apparatus

Figure 1:
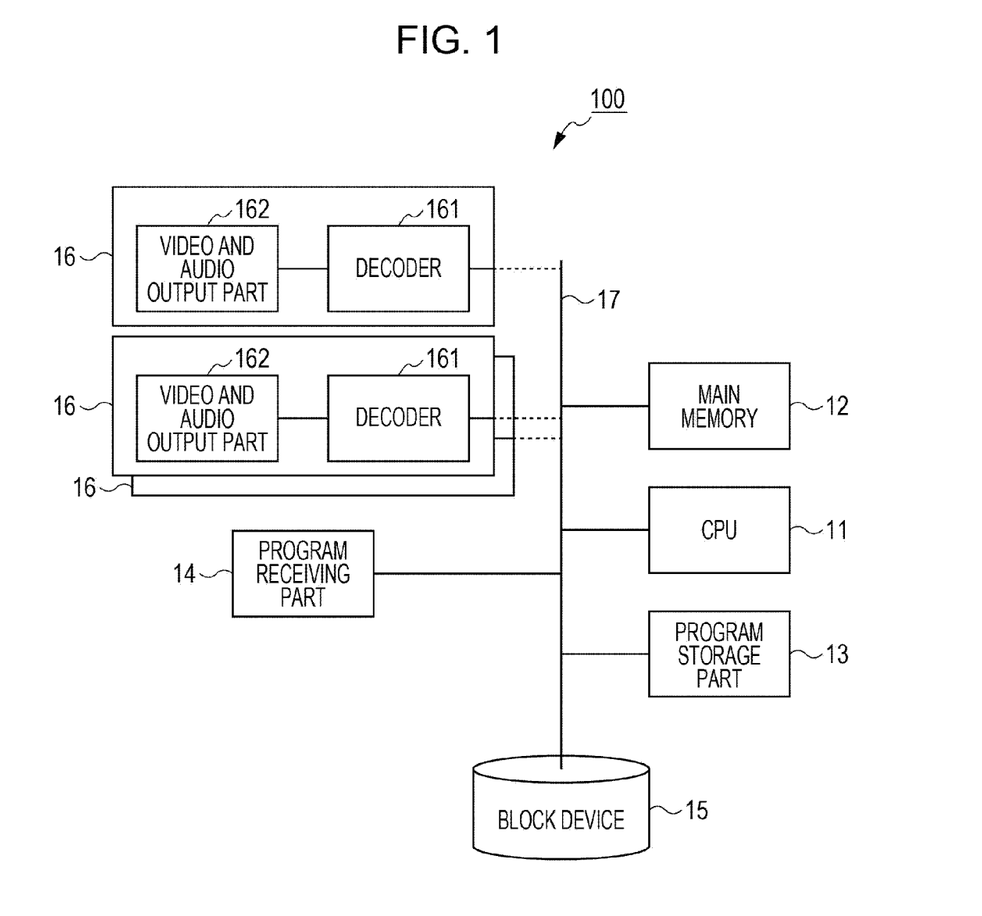
FIG. 1 is a block diagram of the structure of a video-recording and replaying apparatus according to an embodiment of the present disclosure.

FIG. 1 is a block diagram of the structure of a video-recording and replaying apparatus 100 according to an embodiment of the present disclosure.

As depicted in FIG. 1, this video-recording and replaying apparatus 100 includes, for example, a CPU 11 (a control part), a main memory 12, a program storage part 13, a program receiving part 14, a block device 15, program replaying parts 16, and a bus 17.

The CPU (central processing unit) 11 totally controls each part of the video-recording and replaying apparatus 100. The CPU 11 performs various processes in regard to video-recording and replaying of a program by using various programs and data, such as an OS and an application program, stored in the program storage part 13.

The main memory 12 is a memory for use as a working space of the CPU 11.

The program storage part 13 is a storage part having stored therein various programs to be executed by the CPU 11 and data for executing these programs.

The program receiving part 14 is, for example, a digital tuner, such as a terrestrial digital tuner, a BS digital tuner, or a CS digital tuner, or a network interface receiving a program through the Internet. Here, a program to be received refers to information with at least video and audio data multiplexed and compressed for coding and, more specifically, an MPEG-2 (moving picture experts group phase 2) stream or an MPEG-4 stream.

The block device 15 is a device, such as a Blu-ray disk or a hard disk drive, having recorded thereon a program received by the program receiving part 14. Here, the block device is a device in which data write and read are performed by a predetermined unit (a block unit). Inputs and outputs of data to and from the block device are performed through the file system.

The program replaying parts 16 each include a decoder 161 decoding video and audio streams of a program and a video and audio output part 162 outputting video and audio obtained as a result of decoding by the decoder 161. In the present embodiment, the plurality of program replaying parts 16 are connectable to the bus 17 through a network connecting part not shown. The CPU 11 can supply the same program or can selectively supply separate programs to these plurality of program replaying parts 16.

Software Structure of the Video-Recording and Replaying Apparatus

Figure 2:
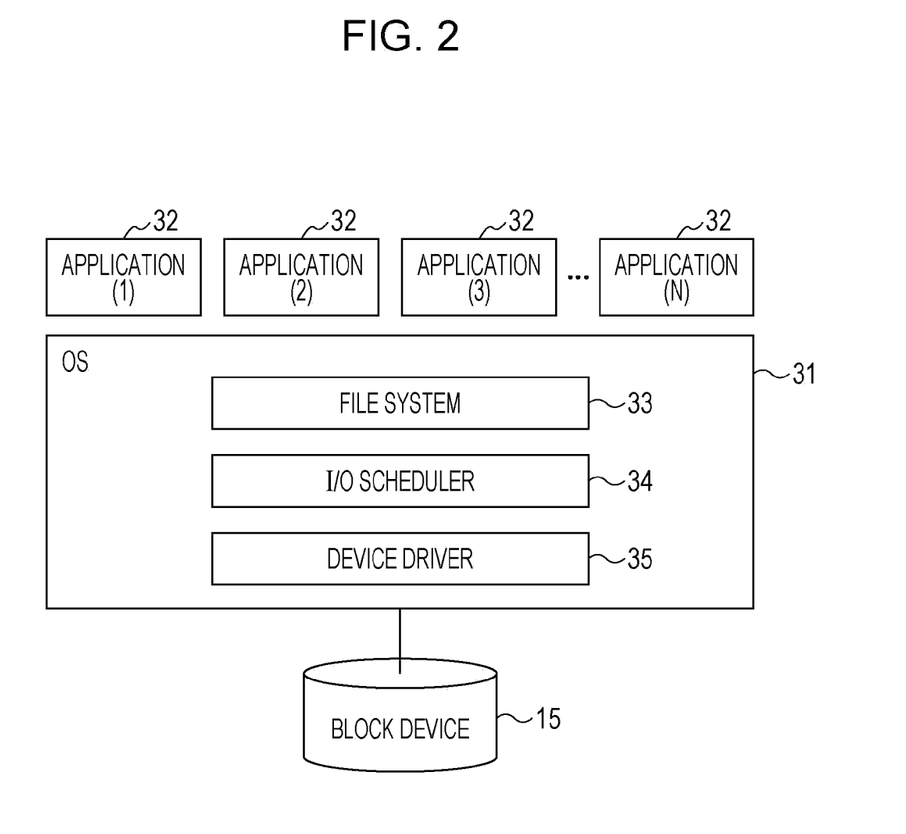
FIG. 2 is a diagram of software structure of the video-recording and replaying apparatus of FIG. 1.

FIG. 2 is a diagram of software structure of the video-recording and replaying apparatus 100 of the present embodiment.

In the video-recording and replaying apparatus 100, an OS (operating system) 31 and a plurality of application programs (hereinafter referred to as applications) 32 operable on the OS 31 are present. Here, each application 32 is, for example, a program for video-recording a program, programs for normal replay, fast-forward replay, slow replay, frame-by-frame replay, and skip replay of a video-recorded program and, furthermore, a program for digest replay of automatically detecting a scene with a high degree of importance in a program and replaying highlights of the program.

The OS 31 includes, for example, a file system 33, an I/O scheduler 34, and a device driver 35. A kernel of the OS 31 handles the application 32 being executed as a "task", which is a unit of process execution.

In response to an I/O request for writing and reading a file from any of the applications 32, the file system 33 converts this I/O request to an I/O request in a block format.

The I/O scheduler 34 is a scheduler for, by way of example, controlling the sequence of I/O requests from each task, coupling a plurality of I/O requests, and temporally controlling allocation of I/O resources for each task in order to improve efficiency of I/O processing on the block device 15. The I/O scheduler 34 has a request queue for each task. To the request queue, a time slice predetermined for each task is set. The I/O scheduler 34 puts an I/O request in a block format received from a task through the file system into a corresponding request queue. At this time, the I/O scheduler 34 merges I/O requests to adjacent sectors into a single data structure called an I/O request for each same type (read request or write request). The I/O scheduler 34 selects one request queue with a round-robin scheme from among request queues for the respective tasks, selects one I/O request from the selected request queue, and passes the I/O request to the device driver 35. This operation of the I/O scheduler 34 will be described in detail further below.

The device driver 35 executes a process requested by the I/O request selected by the I/O scheduler 34 on the block device 15.

Operation of the I/O Scheduler 34

Figure 3:
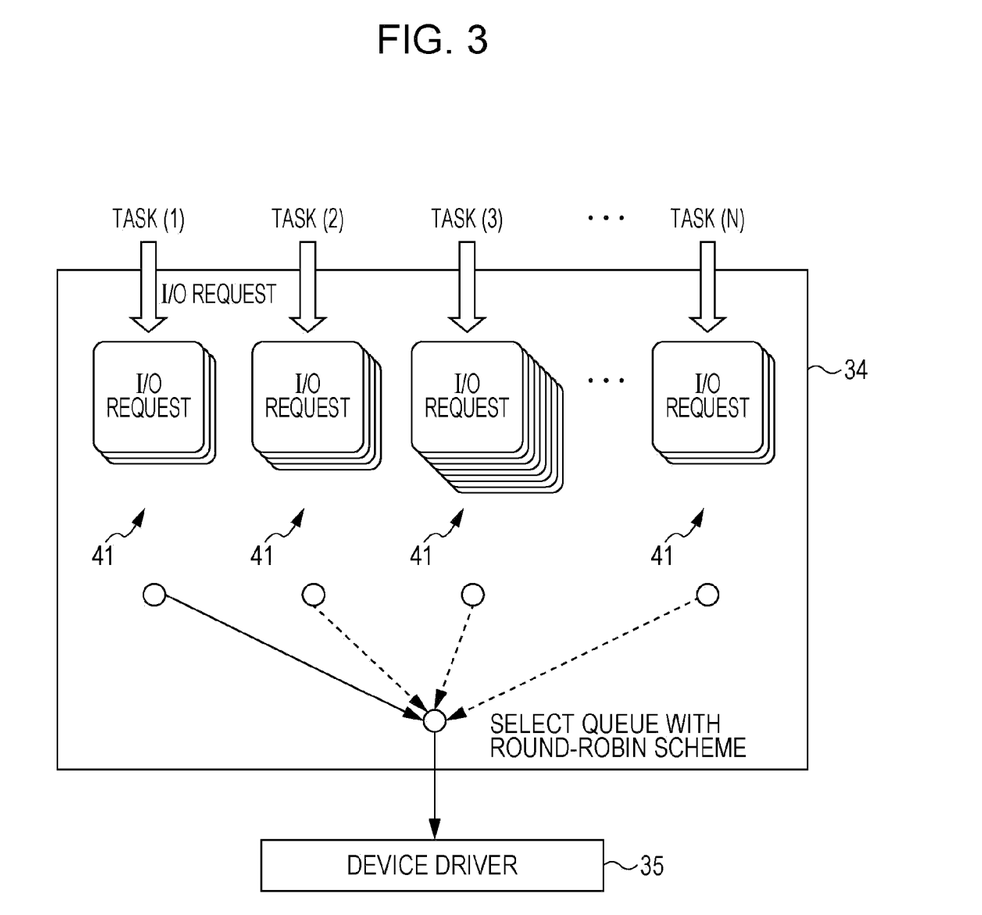
FIG. 3 is a conceptual diagram for describing the operation of an I/O scheduler of the video-recording and replaying apparatus of FIG. 1.

FIG. 3 is a conceptual diagram for describing the operation of the I/O scheduler 34.

As depicted in FIG. 3, the I/O scheduler 34 has a request queue 41 for each task. The I/O scheduler 34 allocates a time slice predetermined for each task so that a total amount of I/O data for each task in each round-robin cycle for the block device 15 is approximately equal.

Here, since the amount of I/O data per unit time at fast-forward replay or digest replay is large compared with that at video-recording or normal replay, a time slice to be allocated to each task for fast-forward replay or digest replay is shorter than a time slice to be allocated to a task for video-recording or normal replay.

1. Registration in the Request Queue 41

In response to an I/O request passed from the application 32 (the task) for writing or reading a file, the file system 33 converts the I/O request containing an identifier for identifying the requesting task into an I/O request in a block format, and passes the converted I/O request to the I/O scheduler 34.

Based on the task identifier contained in the I/O request passed from the file system 33, the I/O scheduler 34 generates or selects any one of the request queues 41, and puts the I/O request in this request queue 41. At this time, I/O requests to adjacent sectors are merged into a single data structure called an I/O request for each same type (read request or write request).

2. Supply of an I/O Request to the Device Driver 35

The I/O scheduler 34 switches the request queue 41 from which an I/O request is passed to the device driver 35 with a round-robin scheme. The round-robin scheme is a scheme of sequentially and cyclically switching the request queue 41 from which an I/O request is passed to the device driver 35. Since the request queue 41 is created for each task, switching the request queue 41 is hereinafter represented as task switching.

Figure 4:
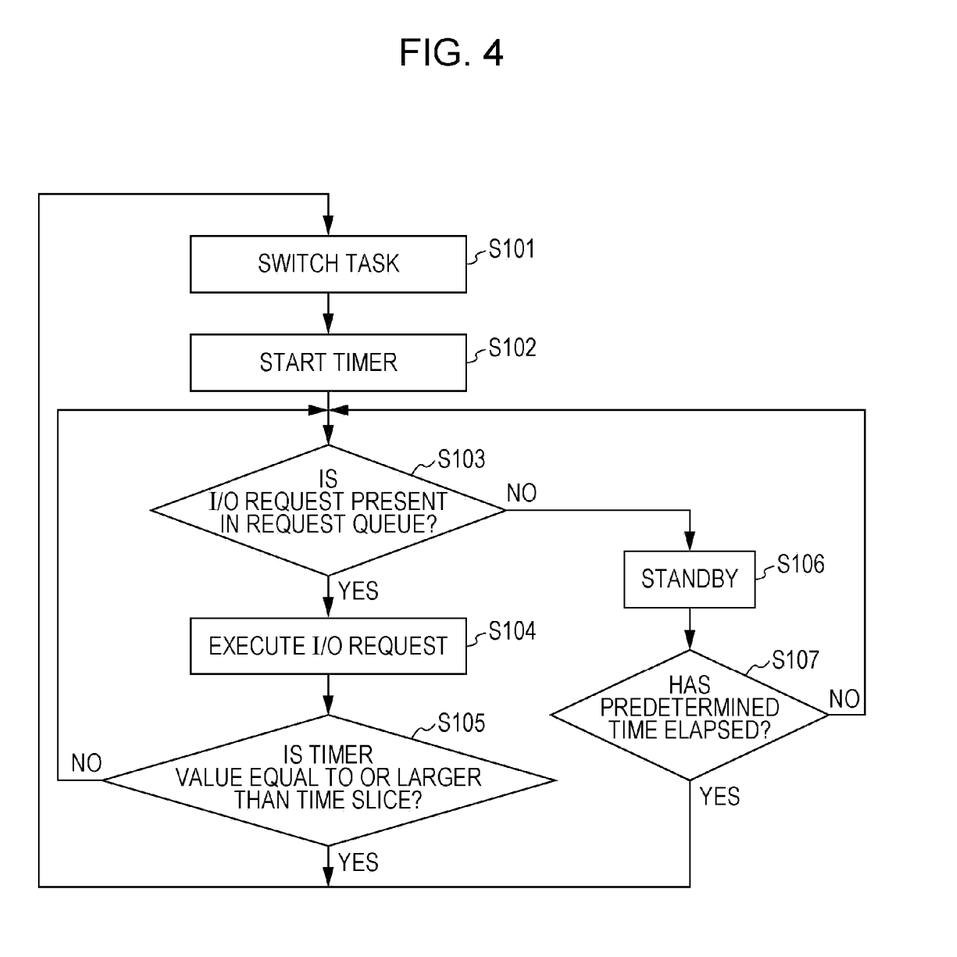
FIG. 4 is a flowchart of round-robin task switching of the video-recording and replaying apparatus of FIG. 1.

FIG. 4 is a flowchart of round-robin task switching.

The processes of this flowchart are repeatedly executed.

Note that the sequence of round-robin task switching is set as, for example, a sequence of tasks where an I/O request occurs earliest first. When a task ends, the ended task is removed from the set task order sequence.

When switching the task (step S101), the I/O scheduler 34 starts a timer (step S102).

Next, the I/O scheduler 34 checks whether the request queue 41 of the task after switching retains an I/O request (step S103). When an I/O request is retained, the I/O request is selected and is passed to the device driver 35, thereby executing that I/O request (step S104).

When the request queue 41 does not retain an I/O request, the I/O scheduler 34 enters in a standby state (step S106). When a new I/O request is registered in the request queue 41 within a predetermined time from the time when the I/O scheduler 34 enters in a standby state (YES at step S103), the I/O scheduler 34 selects that I/O request, and passes the I/O request to the device driver 35. When no new I/O request is registered in the request queue 41 after a lapse of the predetermined time (YES at step S107), the I/O scheduler 34 switches the task, from which an I/O request is selected, to the next task (step S101). The I/O request selected from the request queue 41 is deleted from the request queue 41. Note that the standby state does not continue over the time slice.

After completion of execution of the I/O request, the I/O scheduler 34 checks whether a current timer value is equal to or larger than a time slice value set in the request queue 41 (step S105). When the timer value is smaller than the time slice value set in the request queue 41, the I/O scheduler 34 rechecks whether an I/O request is retained in the request queue 41 (step S103) and, when an I/O request is retained, selects and passes that I/O request to the device driver 35. On the other hand, when the timer value is equal to or larger than the time slice value set in the request queue 41, the I/O scheduler 34 switches the task, from which an I/O request is selected, to the next task (step S101). Also from then on, the processes described above are similarly repeated.

Figure 5:
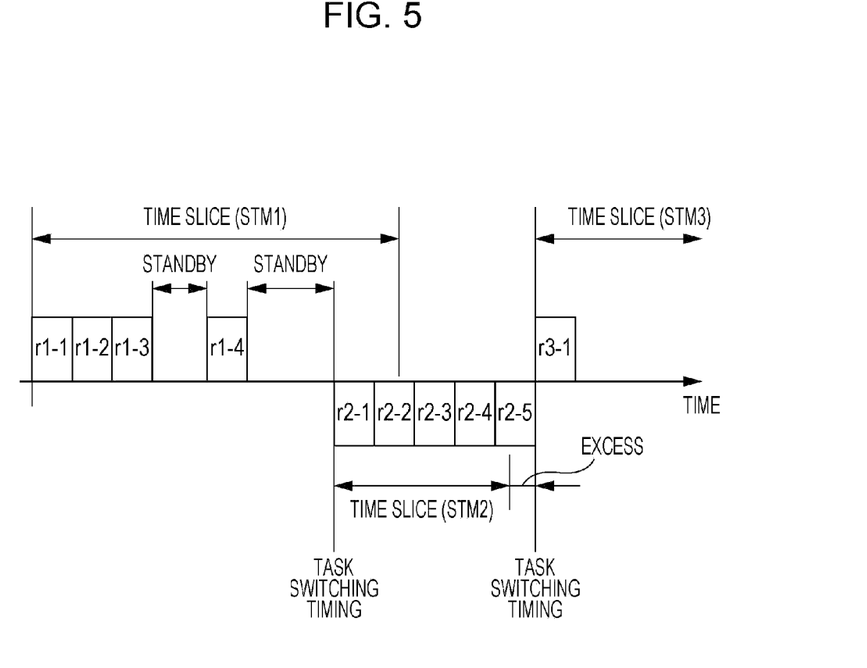
FIG. 5 depicts an example of I/O scheduling of the video-recording and replaying apparatus of FIG. 1.

FIG. 5 depicts an example of I/O scheduling of the present embodiment.

Here, r1-$x$, r2-$x$, and r3-$x$ denote I/O requests from a task 1, a task 2, and a task 3, respectively. -$x$ denotes a position in the sequence of the I/O requests. The round-robin sequence is assumed to be the task 1, the task 2, and then the task 3. STM1, STM2, and STM3 are time slices set to the task 1, the task 2, and the task 3, respectively. These STM1, STM2, and STM3 each have a value predetermined for each task so that a total amount of I/O data for each task in each round-robin cycle for the block device 15 is approximately equal. A relation in length among the time slices is assumed to be STM1>STM2. For example, the task 1 processes video-recording and the task 2 processes fast-forward replay. That is, since the amount of I/O data per unit time at fast-forward replay is larger than that at video-recording, when the time slices are determined so that a total amount of I/O data for each task in each round-robin cycle for the block device 15 is approximately equal, a time slice to be allocated to a task for fast-forward replay is shorter than a time slice to be allocated to a task for video-recording.

The I/O scheduler 34 selects an I/O request from the request queue 41 of the task 1. The I/O scheduler 34 selects the I/O requests one by one from the request queue 41 of the task 1 within the time slice STM1 and passes the I/O requests to the device driver 35.

In the example of FIG. 5, the case is depicted in which three I/O requests r1-1, r1-2, and r1-3 are sequentially selected from the request queue 41 of the task 1. After the third I/O request r1-3 is executed, the request queue 41 of the task 1 temporarily becomes blank. Therefore, the I/O scheduler 34 enters a standby state with a predetermined time being taken as an upper limit. In this example, a new I/O request r1-4 is newly registered in the request queue 41 of the task 1 before the predetermined time elapses after the I/O scheduler 34 enters a standby state. Therefore, the I/O scheduler 34 selects that I/O request r1-4. Then, since the request queue 41 of the task 1 becomes blank again, the I/O scheduler 34 enters a standby state again. Then, since no new I/O request is newly registered in the request queue 41 of the task 1 after a lapse of the predetermined time, the I/O scheduler 34 performs task switching.

Then, the I/O scheduler 34 selects an I/O request from the request queue 41 of the task 2. In this example, the task 2 is a task having a relatively large amount of I/O data per unit time, such as fast-forward replay. Therefore, from the request queue 41 of the task 2, the I/O requests r2-1, r2-2, r2-3, r2-4, and r2-5 are successively selected during the time slice STM2. Here, the time slice STM2 has elapsed before the end of execution of the final I/O request r2-5. When judging as such, the I/O scheduler 34 performs task switching.

Then, the I/O scheduler 34 selects an I/O request from the request queue 41 of the task 3.

As described above, according to the I/O scheduling of the present embodiment, the time slice for each task is set so that a total amount of I/O data for each task in each round-robin cycle for the block device 15 is approximately equal. With this, when I/O resources for the block device are shared among tasks, nonuniformity of the amount of I/O data among tasks can be reduced. Therefore, multitasking in regard to video-recording and replaying can be excellently performed. For example, video-recording of a broadcast program can be excellently performed simultaneously with a process of reading a large amount of data for fast-forward replay, digest replay, or the like.

Also, according to the I/O scheduling of the present embodiment, when the request queue 41 of the task being selected is blank, task switching is performed before a lapse of the time slice. Therefore, use efficiency of I/O resources can be improved. Also from this point of view, multitasking in regard to video-recording and replaying can be excellently performed.

Modification Example

Next, a modification example of the embodiment described above is described.

In the embodiment described above, as described with reference to FIG. 5, only task switching is performed if the time slice STM2 has elapsed before the end of execution of the final I/O request r2-5 of the task 2. An excess time from the time slice STM2 at the end of execution of the I/O request r2-5 delays the start of the next task processing. If such a delay occurs for each round-robin cycle, delays in timing of starting the next task processing gradually accumulate, thereby possibly degrading real-time properties of processing.

To get around this, a time obtained by subtracting the excess from the time slice from a default time slice is set as a time slice for the next round-robin cycle, then in a cycle subsequent to the next cycle, the time slice is back to the default time slice, and this series of processing is repeatedly performed. That is, two round-robin cycles are considered. In the first cycle, an excess from the default time slice is obtained. In the next cycle, a time obtained by subtracting the excess from the default time slice is adopted. Then, these two cycles are repeated. With this, an adverse effect on multitasking due to accumulation of excesses from the time slice can be avoided.

Figure 6:
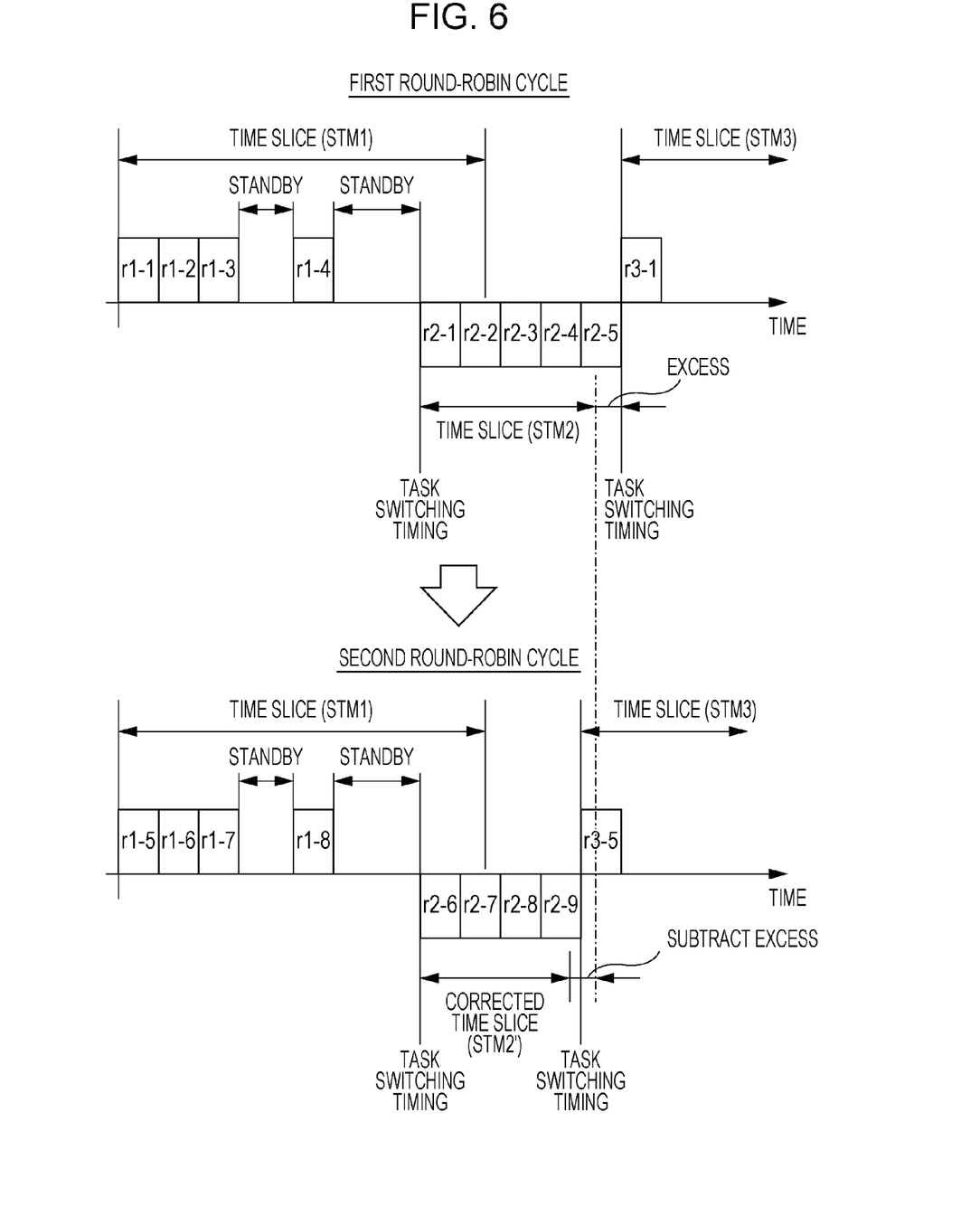
FIG. 6 is a diagram for describing I/O scheduling of a modification example of the embodiment of the present disclosure.

FIG. 6 is a diagram for describing I/O scheduling of the modification example.

FIG. 6 depicts I/O scheduling for two round-robin cycles described above.

r1-x, r2-x, and r3-x denote I/O requests from a task 1, a task 2, and a task 3, respectively. The round-robin sequence is assumed to be the task 1, the task 2, and then the task 3. STM1, STM2, and STM3 are default time slices predetermined for each task so that a total amount of I/O data for each task in each round-robin cycle for the block device 15 is approximately equal.

In the first cycle of the two round-robin cycles, if the default time slice STM2 has elapsed at the end of execution of the I/O request selected from the request queue of the task 2, the I/O scheduler 34 calculates an excess time. That is, in the example of FIG. 6, an excess time from the default time slice STM2 at the end of execution of the I/O request r2-5 is calculated.

In the second cycle of the two cycles, in place of the default time slice STM2, the I/O scheduler 34 adopts a time obtained by subtracting the excess time from the default time slice STM2 as a corrected time slice STM2'. This can avoid accumulation of delays in timing of starting a process on a task subsequent to a task for performing I/O processing on the block device 15 at a high rate, such as fast-forward replay, and nonuniformity of the amount of I/O data among tasks can be more mitigated.

The present disclosure is not restricted to the embodiments described above, and can be variously modified within a scope not deviating from the gist of the present disclosure.

What is claimed is:

1. A video-recording and replaying apparatus comprising:
a block device for use as a recording medium for video-recording; and
a control part, when a plurality of tasks each representing a process in regard to video-recording and replaying on the block device are executed, performing I/O scheduling on the block device by using time slices each predetermined for each of the tasks so that a total amount of I/O data for each of the tasks in each round-robin cycle for the block device is approximately equal,
in which the plurality of tasks include a fast-forward replay task and a normal replay task, and
in which the respective I/O data for the fast-forward replay task is larger than the respective I/O data for the normal replay task per unit of time, so that a time slice for the fast-forward replay task is shorter than a time slice for the normal replay task.

2. The video-recording and replaying apparatus according to claim 1, wherein, when a request queue of a task being selected is blank, the control part performs task switching without waiting for a lapse of the time slice.

3. The video-recording and replaying apparatus according to claim 1, wherein the control part sets a time obtained by subtracting an excess from the time slice at the end of execution of an I/O request from a default time slice as a time slice in a next round-robin cycle, and resets the time slice to the default time slice in a cycle subsequent to the next cycle.

4. An I/O scheduling method comprising
when a plurality of tasks each representing a process in regard to video-recording and replaying on a block device for use as a recording medium for video-recording are executed, performing I/O scheduling on a block device by using time slices each predetermined for each of the tasks so that a total amount of I/O data for each of the tasks in each round-robin cycle for the block device is approximately equal, in which the plurality of tasks include a fast-forward replay task and a normal replay task, and in which the respective I/O data for the fast-forward replay task is larger than the respective I/O data for the normal replay task per unit of time, so that a time slice for the fast-forward replay task is shorter than a time slice for the normal replay task.

5. A non-transitory computer readable storage memory having stored thereon a program to cause a computer to operate a process as a control part, the process comprising:

performing I/O scheduling on a block device for use as a recording medium for video-recording by using time slices each predetermined for each of a plurality of tasks each representing a process in regard to video-recording and replaying on the block device so that a total amount of I/O data for each of the tasks in each round-robin cycle for the block device is approximately equal, in which the plurality of tasks include a fast-forward replay task and a normal replay task, and in which the respective I/O data for the fast-forward replay task is larger than the respective I/O data for the normal replay task per unit of time, so that a time slice for the fast-forward replay task is shorter than a time slice for the normal replay task.

* * * * *